(12) United States Patent
Cadugan et al.

(10) Patent No.: US 9,291,876 B2
(45) Date of Patent: Mar. 22, 2016

(54) SYSTEM AND METHOD FOR CONTROLLING A MOTOR

(71) Applicant: Allegro Microsystems, LLC, Worcester, MA (US)

(72) Inventors: Bryan Cadugan, Bedford, NH (US); Alexander Latham, Still River, MA (US)

(73) Assignee: Allegro Microsystems, LLC, Worcester, MA (US)

( * ) Notice: Subject to any disclaimer, the term of this patent is extended or adjusted under 35 U.S.C. 154(b) by 0 days.

(21) Appl. No.: 13/904,356

(22) Filed: May 29, 2013

(65) Prior Publication Data

US 2014/0355973 A1 Dec. 4, 2014

(51) Int. Cl.
H02P 7/00 (2006.01)
H02P 23/00 (2006.01)
H02P 25/02 (2006.01)
H02P 31/00 (2006.01)
G03B 13/34 (2006.01)

(52) U.S. Cl.
CPC ........ *G03B 13/34* (2013.01); *H02P 7/00* (2013.01); *H02P 23/0004* (2013.01); *H02P 25/028* (2013.01); *H02P 31/00* (2013.01)

(58) Field of Classification Search
USPC .......................................................... 396/133
See application file for complete search history.

(56) References Cited

U.S. PATENT DOCUMENTS

| 5,250,884 | A | 10/1993 | Okumura |
| 5,511,052 | A | 4/1996 | Perry |
| 5,973,468 | A | 10/1999 | Yamauchi |
| 6,972,799 | B1 * | 12/2005 | Hashimoto .................. 348/350 |
| 8,084,969 | B2 | 12/2011 | David et al. |
| 8,138,708 | B2 | 3/2012 | Ward et al. |
| 2003/0012568 | A1 * | 1/2003 | Ishikawa et al. .............. 396/104 |
| 2003/0199997 | A1 | 10/2003 | Gao |
| 2010/0127655 | A1 | 5/2010 | Ward et al. |
| 2010/0188032 | A1 * | 7/2010 | Takai ....................... 318/400.21 |
| 2011/0058093 | A1 | 3/2011 | Kim |
| 2014/0098285 | A1 * | 4/2014 | Latham et al. ................ 348/350 |

FOREIGN PATENT DOCUMENTS

EP 0 735 744 A1 10/1996
JP 2012088596 A 5/2012

(Continued)

OTHER PUBLICATIONS

U.S. Appl. No. 13/647,859, filed Oct. 9, 2012, Latham et al.

(Continued)

*Primary Examiner* — Clayton E Laballe
*Assistant Examiner* — Noam Reisner
(74) *Attorney, Agent, or Firm* — Daly, Crowley, Mofford & Durkee, LLP

(57) ABSTRACT

A system for controlling a motor may include a motor driver circuit for driving a camera motor. A memory capable of storing a plurality of parameters for controlling the camera motor may also be included. A set of parameters from the memory may be chosen to be applied to driving the motor. A motor control module may receive a signal from the control logic module, apply the chosen set of parameters to driving the camera motor, and command the motor driver circuit to drive the motor in accordance with the applied set of parameters. The parameters may be chosen based on desired behavior of the system and various other stimuli.

28 Claims, 4 Drawing Sheets

(56) References Cited

FOREIGN PATENT DOCUMENTS

| JP | 2012247709 A | 12/2012 |
| WO | WO 2005/091067 A2 | 9/2005 |
| WO | WO 2005/091067 A3 | 9/2005 |

OTHER PUBLICATIONS

PCT Search Report and Written Opinion of the ISA dated Dec. 6, 2013; for PCT Pat. App. No. PCT/US2013/060355; 14 pages.
Anonymous; "Logix5000 Controllers Advanced Process Control and Drives Instructions—Reference Manual;" XP055087241; http://literature.rockwellautomation.com/idc/groupd/literature/documents/rm/1756-rm006_-en-p.pdf; Sep. 2010; 225 pages.
Allegro Microsystems, Inc.; "A1456 Closed Loop Micro-Power Hall IC with Full-Bridge Driver, Internal Calibration, and $I^2C$ Interface for Camera Auto Focus Applications;" Data Sheet; Jul. 6, 2012; 21 pages.
Notice of Allowance dated Jul. 8, 2014; for U.S. Appl. No. 13/647,859; 16 pages.
International Preliminary Report on Patentability dated Apr. 23, 2015 for PCT Application No. PCT/US2013/080356; 11 pages.
Taiwanese Office Action including Search Report with English summary dated Oct. 7, 2015, for Taiwanese Pat. App. No. 103114528; 15 pages.
PCT Search Report and Written Opinion of the ISA for PCT/US2014/033944, dated Jul. 3, 2015; 12 pages.

\* cited by examiner

Chip-level system diagram

SYSTEM AND METHOD FOR CONTROLLING A MOTOR

FIELD

This disclosure relates to circuits, systems, and processes for controlling a motor and, in particular, for controlling a camera lens motor.

BACKGROUND

Various types of motor controllers are used to control motors. Motor controllers may drive the motor by providing power to motor coils within the motor in various sequences in order to control operation of the motor. Simple control of a motor includes starting, stopping, and reversing direction of a motor. However, many motor applications require more sophisticated control over motors. For example, a camera lens having an auto-focus mechanism may require precise timing and positioning of the motor during focusing operations. Such systems may also require that the motor is controlled in different ways depending upon the circumstances. For example, a camera designer may want the focusing motor for a camera lens to behave one way when the camera is used to take still pictures, and another way when the camera is used to take videos.

In systems that require complex or precise motor control, motor controllers may employ more complex control algorithms to provide greater control over motor movement. For example, Proportional-Integrator-Differential (PID) controllers combine a signal representing the current position of the motor, with a signal representing the integral of the position of the motor, and a signal representing the differential of the position of the motor, in order to provide fine control over the motor as the motor moves. The function of such algorithmic controllers can be fine tuned with coefficients, e.g. constant data values that become part of the equation for controlling the motor.

SUMMARY

The present disclosure provides systems and methods for controlling a motor.

In an embodiment, a system includes a motor driver circuit for driving a camera motor and a memory capable of storing a plurality of parameters for controlling the camera motor. A control logic module configured to determine a set of the plurality of parameters to apply to driving the motor, and to generate a signal indicating which set to apply may also be included. The system may also comprise a motor control module configured to receive a signal from the control logic module, apply the set of perameters to driving the camera motor, and command the motor driver circuit to drive the motor in accordance with the applied set of parameters.

The control logic module may be further configured to determine the set of the plurality of parameters to apply based on: a mode of camera operation, a change in position of the camera motor caused by external stimulus, a distance for the camera motor to move, or a combination thereof.

In an embodiment, a method for controlling a camera motor comprises the steps of: storing a plurality of parameters in a memory for controlling a motor driver, determining a set of the plurality of parameters to apply to the motor driver to achieve a desired operation behavior of the motor; changing the operational behavior of the motor driver by applying the set of parameters to the motor driver; and driving a motor with the motor driver according to the applied set of parameters.

The method may further comprise determining the set of the plurality of parameters based on: a mode of camera operation, a change in position of the motor caused by external stimulus, a distance for the motor to move, or a combination thereof.

BRIEF DESCRIPTION OF THE DRAWINGS

Like numbers in the drawings denote like elements. Connectors within circuit or block diagrams may represent single wires, buses, or other types of connections between blocks. A single connector line should not be construed to limit the type of connection to a single wire.

Figure 1:
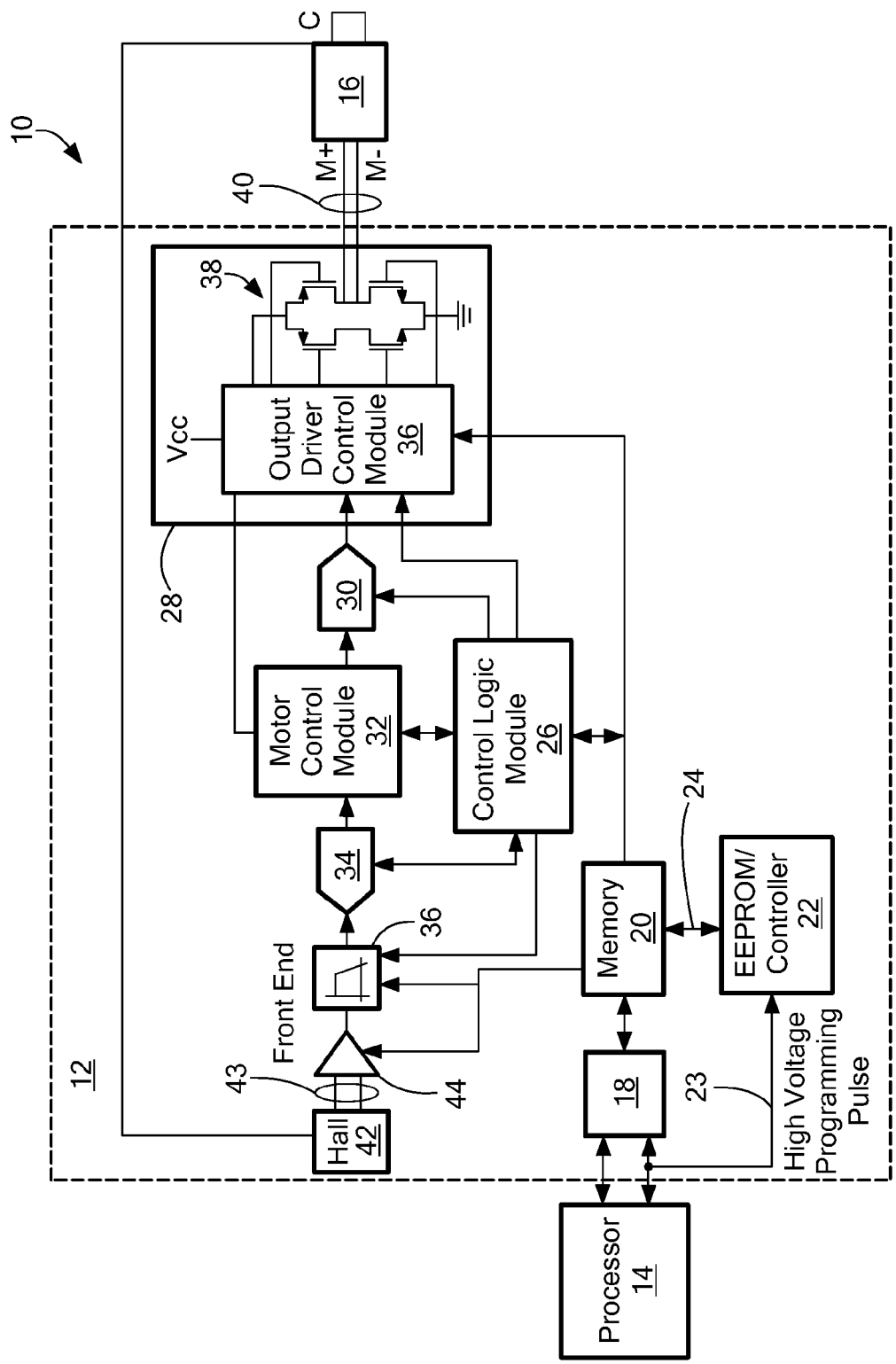
FIG. 1 is a block diagram of a system for controlling a motor.

The figures, including the flowcharts and block diagrams, are provided for exemplary purposes and are not intended to limit the scope of this disclosure. Although the figures depict diagrams and flowcharts with particular numbers of blocks connected in particular arrangements or sequences, these are examples only. Other arrangements and sequences are within the scope of this disclosure.

DETAILED DESCRIPTION

Before describing the present invention, some introductory concepts and terminology are explained. As used herein, the term "magnetic field sensing element" is used to describe a variety of electronic elements that can sense a magnetic field. The magnetic field sensing element can be, but is not limited to, a Hall effect element, a magnetoresistance element, a magnetotransistor, or a resolver, for example.

A spinning motor can act like a generator. The electromotive force produced by the spinning motor may be referred to as back-EMF. Signals produced by this back-EMF can be measured to determine the position and speed of the motor. For example, the magnitude of the back-EMF signals may be directly proportional to the speed of the motor. In some instances, these signals can be measured without the need for an external sensor. In these so-called "sensorless systems," the back-EMF signals may be fed back directly from the motor into an input of the motor driver circuit.

Different types of Hall effect elements can also be used to measure position and speed of the motor. These Hall effect elements include, for example, a planar Hall element, a vertical Hall element, and a circular vertical hall (CVH) element. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb), or another compound semiconductor materialInGaAsP, or high mobility material, for example GaN.

As used herein, the term "signal" is used to describe an electronic characteristic, analog or digital, that can change over time. In contrast, as used herein, the term "value" is used to describe a digital electronic value that tends to be static, or that tends to change from time to time. However the terms signal and value can be used interchangeably.

As used herein, the term "demand" or "demand signal" is used to describe any electronic signal, analog or digital, that controls an amount of power applied to a motor. For example, as the demand signal changes, the amount of power applied to a motor may also change.

As used herein, the terms "software" and "firmware" may refer to computer readable instructions, stored in a volatile or non-volatile computer readable storage medium (such as a hard drive or memory). For the purposes of this application a computer readable instruction may be carried out in a circuit (electronic circuit) and does not require a "computer". The computer readable instructions, when executed by a processor or circuit, may cause the processor or circuit to perform operations and/or processes described below. The terms "software" and "firmware" may also refer to other types of instructions such as microcode, machine-code, scripts, pseudo code, or any type of computer readable instruction set that can be stored in a computer readable storage medium and executed by a processor or circuit.

This disclosure describes various circuits, systems, methods, and the like for controlling a motor. These circuits, systems, and methods may be implemented in hardware, in software, or in a combination of hardware and software. The circuits, systems, and methods may, for example, be implemented in whole or in part by an integrated circuit, by a discrete component circuit, by software instructions stored in a computer readable storage medium and executed by a computer processor or other circuit that can execute software instructions, or by a combination thereof.

Referring to FIG. 1, a system 10 for controlling a motor may include a motor controller 12 coupled to a processor 14 and a motor 16. In an embodiment, the motor controller 12 may be an integrated circuit, and may be implemented on one or more silicon dies or chips. The silicon chips may be incorporated into a single package, or into multiple packages as desired.

Processor 14 may be any circuit or system that can communicate with and control motor controller 12. In an embodiment, motor 16 may be a camera lens motor. For example, motor 16 may be a motor that focuses a camera lens that controls an aperture of a camera lens, etc. In other embodiments, motor controller 12 can control other types of motors including, but not limited to, a motor for controlling a valve, a motor for controlling precision positioning systems (e.g. for controlling a printer, a plotter, a precision robotic arm, a motor in an electronic pick and place machine, etc.), or for controlling motors in other actuator systems.

Motor controller 12 may include digital circuitry, analog circuitry, or a mix of digital and analog circuitry for driving the motor 16. Motor controller 12 may also include processors and software code.

As shown, motor controller 12 may include a communications module 18 coupled to processor 14. Communications module 18 may be a serial or parallel bus communications module that can send commands to and receive command from processor 14. In an embodiment, communications module 18 may be an I2C module, a serial port, an SMBus module, a parallel port, or any other type of serial or parallel communication module.

Communications module 18 may also be coupled to memory 20. Memory 20 may be a volatile or non-volatile memory that can store data. For example, memory 20 may be a RAM, a ROM, a met of registers, a FLASH, an EEPROM, or any other type of memory that can store data. In an embodiment, memory 20 may be a register set that can be written and read by other system components quickly. In an embodiment, memory 20 may be part of the same integrated circuit as the other circuits and blocks that comprise motor controller 12. Memory 20 may also be a separate integrated circuit that is in the same package as the other circuits of motor controller 12, or memory 20 may be in a separate package that can be coupled to motor controller 12.

Motor controller 12 may also include an EEPROM and controller 22. EEPROM/Controller may be a non-volatile memory that can store and retain data when motor controller 12 is unpowered. Memory 20 may access EEPROM/Controller 22 via memory bus 24. In an embodiment, memory 20 may access data stored in EEPROM/controller 22 when motor controller 12 first starts up, or during operation of motor controller 12. EEPROM/Controller 22 may include circuitry to program or re-program the contents of the EEPROM via programming signal 23 and/or memory bus 24.

In an embodiment, memory 20, EEPROM/Controller 22, or any other memory module included in motor controller 12 may store data that can be used to control the way motor controller 12 drives motor 16. For example, memory 20 may store coefficients that can be applied to circuits such as filter 36 and motor control module 32 within motor controller 12 to change the way motor controller 12 controls motor 16. This process will be described below in greater detail.

Motor control 12 may include a control logic module 26. Control logic module 26 may be a circuit or processor capable of controlling operation of motor controller 12. Control logic module 26 may be coupled to memory 20 and capable of reading and writing data to memory 20. Although not shown, control logic module 26 may also be coupled to and able to read and write from EEPROM/Controller 22 and/or any other memory module within system 10. Motor control module 26 may also be coupled to motor driver circuit 28, digital-to-analog converter (DAC) 30, motor control module 32, analog-to-digital converter 34, and filter 36.

Motor drive circuit 28 may be a circuit configured to drive motor 16 by energizing and providing power to the coils of motor 16. As shown, motor drive circuit 28 may include an output driver control module 36 and an H-bridge 38. The output driver control module may control switching of the transistors within H-bridge 38 so as to energize or do-energize the motor coils. By energizing and do-energizing the magnetic coils of motor 16 in various patterns and sequences, output driver control module 36 may cause motor 16 to start, stop, accelerate, decelerate, and/or change directions.

The interface 40 between motor driver circuit 28 and motor 16 may be a two-wire interface, as shown. Interface 40 may also comprise other types of motor interfaces including, but not limited to, a four-wire, five-wire, six-wire, eight-wire, or other type of motor interface. Interface 40 may be a single phase, double phase, three-phase, four-phase, or any other type of interface depending upon the type of motor. In an embodiment, interface 40 may be any type of BLDC motor interface.

Motor control module 32 may comprise circuitry for controlling operation of motor 16. For example, circuitry within motor control module 32 may send signals, commands, or instructions to motor driver circuit 28 that control how motor driver circuit 28 drives motor 16. These signals may include instructions such as which direction to drive motor 16, a desired motor speed, a desired motor acceleration, etc. The motor driver circuit 28 may then drive the motor 16 in accordance with the instructions received from motor control module 32.

In an embodiment, signals sent between motor control module 32 and motor driver circuit 28 may be analog signals, digital signals, or a combination of analog and digital signals. DAC 30 may, in an embodiment, convert at least some digital signals from digital to analog signals as those signals are sent from motor control module 32 to motor driver circuit 28.

Motor controller 12 may also include a magnetic field sensor 42, which may detect the position and/or speed of motor 16 and produce a signal 43 representative of the position and/or speed of motor 16. Sensor 42 may be a Hall-effect sensor comprising one or more Hall-effect elements, a magnetoresistive sensor comprising one or more magnetoresistive elements, a giant-magnetoresistive sensor comprising one or more giant-magnetoresistive elements, a back-EMF sensor to detect back-EMF signals from motor 16, etc. Sensor 42 is shown on the left side of FIG. 1 for ease of illustration. In an embodiment, sensor 42 may be positioned on or near motor 16 so that sensor 42 can detect the speed and position of motor 16.

Amplifier 44 may be coupled to receive motor position signals from sensor 42. Since the amplified motor position signals may include noise or other undesired signal elements, motor controller 12 may also include filter 36.

In an embodiment, filter 36 may be a digital filter including, but not limited to, an FIR filter, an IIR filter, or the like. Filter 36 may also be configurable. For example, if filter 36 is an FIR or IIR filter, filter 36 may receive filtering coefficients from control logic module 26 that control the operation of filter 36. When applied to filter 36, these coefficients may change the transfer function of filter 36. The coefficients may also change the type of filtering performed by filter 36. For example, the coefficients may cause filter 36 to act as a low pass filter, a high pass filter, a notch filter, a band filter, or a combination thereof. In an embodiment, the coefficients may be stored in memory 20 and/or EEPROM/Controller 22.

As shown in FIG. 1, motor controller 12 may implement a feedback control loop for controlling motor 16. For example, the position of motor 16 as detected by sensor 42 may act as a feedback signal for controlling motor 16. The position signal may be processed by filter 36, converted to a digital signal by ADC 34, and fed into motor control module 32. Motor control module 32 may then instruct motor driver circuit 28 to drive motor 16 in accordance with the received feedback signal.

In operation, control logic module 26 may alter the way motor control module 32 and filter 36 operate by providing coefficients to motor control module 32 and filter 36 based on various factors. These factors can include whether a camera (e.g. a camera in which system 10 is installed) is operating in still-photograph mode or video mode, for example.

Assuming that the camera is operating in still-picture mode, it may be desirable for the camera to focus the lens as quickly as possible. It may be acceptable for the lens to overshoot and subsequently return the optimal focus position so long as the lens can move to the optimal focus position in the least possible amount of time. Accordingly, if the camera is operating in still-picture mode, control logic module 26 may provide coefficients to filter 36 and motor control module 32 that cause motor driver 12 to move motor 16 to the optimal focus position in the least amount of time, and which may allow for overshoot of the motor's position.

Now assuming that the camera is operating in video mode, it may be desirable for the lens to reach the optimal focus position more slowly, so long as the lens reaches the optimal focus position without any overshoot. Accordingly, if the camera is operating in video mode, control logic module 26 may provide coefficients to filter 36 and motor control module 32 that cause motor driver 12 to move motor 16 to the optimal focus position without overshoot.

Control logic module 26 may also select coefficients based upon a distance the motor must move to reach the optimal focus position. For example, if the motor must move a short distance, control logic module 26 may program motor control module 32 and/or filter with a particular set of coefficients to optimize the movement over a short distance. Alternatively, if the motor must move a longer distance, control logic module 26 may program motor control module 32 and/or filter 36 with another set of coefficients to optimize the movement over a longer distance. Different sets of coefficients may be programmed into motor control module 32 and/or filter 36 based on the total distance that motor 16 must move, and whether motor 16 must move a short distance, a long distance, or any intermediate distance.

Many application specify overshoot in terms of a percentage of the total movement of the motor. However, in lens autofocus applications, overshoot may be specified as a fixed number of microns. For example, an autofocus application may require the lens to reach its final position as quickly as possible and with less than X microns of overshoot regardless of the distance traveled by the lens. Therefore, if the lens travels a large distance, the motor controller may be required to move the lens with a proportionally smaller percentage overshoot than when the lens travels a small distance. Accordingly, control logic module 26 may apply a different set of coefficients tailored for each of these scenarios.

Control logic module 26 may also choose coefficients based on whether the position of motor 16 was changed due to external forces or stimuli. For example, if motor 16 is the focusing motor for a camera lens, and external forces cause the camera lens and lose focus or otherwise displace the camera lens, motor controller 12 may detect such movement and cause motor 16 to re-focus the lens. Such external forces may include a person turning the camera lens so that it is no longer focused, dropping the camera so that the lens moves out of focus, or any other external stimulus that can move the lens out of focus. As motor controller 12 re-focuses the lens, control logic module 26 may select coefficients tailored to re-focusing the lens and apply them to filter 36 and motor control module 32.

Control logic module 26 may also modulate coefficients based on the position of the motor and/or the magnitude of a motor movement. Modulating the coefficients may comprise computing the coefficients so the coefficients are tailored for a specific motor movement. For example, memory 20 may include one or more sets of base coefficients, which can then be modified or further processed by control logic module 26 based on the type of motor movement requested, as well as modification coefficients which are stored in memory 20.

Figure 2:
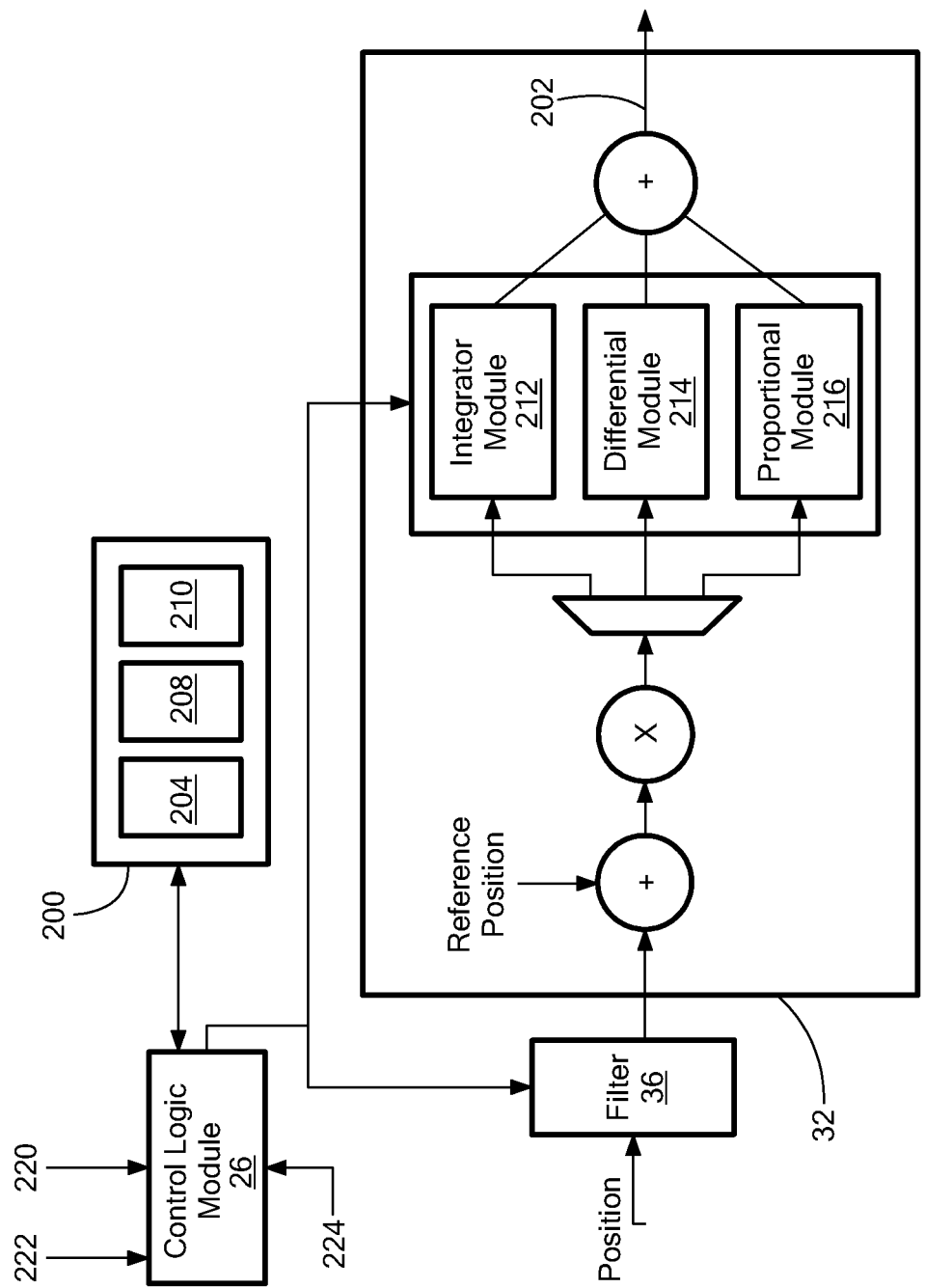
FIG. 2 is a block diagram of a motor control module of FIG. 1 showing coefficient sets.

FIG. 2 is a block diagram showing control logic module 26, memory 200, filter 36, and motor control module 32. In an embodiment, memory 200 may be the same as or similar to memory 20, EEPROM 22, or other types of memory (see FIG. 1). The signal 202 is an output of motor control module 32 that may be provided to DAC 30 or output driver control module 36 in FIG. 1.

As shown in FIG. 2, memory 20 may comprise sets of coefficients 204, 208, and 210. Although three sets are shown, memory 20 may store more or fewer sets of coefficients as required. Memory 20 may also store coefficients individually, rather than in sets, if desired. The coefficients stored in memory 20 may be applied to motor control module 32 and/or filter 36 to control or affect the way motor control module 32 and/or filter 36 operate.

Control logic module 26 is shown having three inputs: a signal 220 representing a camera mode, a signal 222 representing a current position of the motor (e.g. the current position of the motor as detected by sensor 42), and a command signal 224. The command signal may comprise one or more pins or signals that can be used to control the motor 16. For example, command signal 224 can include signals instructing control logic module 26 to move, stop, drive, or reverse the motor 16. In an embodiment, command signal 224 comprise a signal that instructs control logic module 26 to apply a particular set of coefficients to filter 36 and/or to motor control module 32. For example, the command signal 224 can be used to override the camera mode signal 220 and/or the motor position signal 222 and force control logic module 26 to apply a particular coefficient or set of coefficients, if desired. In an embodiment, control signal 224 may be provided by an external device or component, such as processor 14 for example. Control logic module 26 may also have other inputs that can determine, in whole or in part, which coefficients to apply to filter 36 and/or motor control module 32.

Control logic module 26 may also have other inputs it can use to determine which set of coefficients to apply. These inputs may include, but are not limited to: an effort signal representing how hard the motor 16 is being driven, an orientation signal that indicates the physical orientation (position, direction, rotation, etc.) of the lens with respect to a fixed reference such as gravity, an ambient temperature signal, an IC or motor temperature signal, etc.

Control logic module 26 may include logic (e.g. circuits, software, etc.) to determine which coefficients to apply based on the signals 220, 222, and 224.

In an embodiment, motor control module 32 may be a Proportional-Integral-Derivative (PID) motor controller. A PID motor controller is a negative feedback controller that calculates an error between a measured value (e.g. the position of motor 16 as measured by sensor 42) and a desired value (e.g. a desired final position of motor 16). The PID controller includes three parameters, illustrated in FIG. 2 as integrator module 212, differential module 214, and proportional module 216.

Each of these modules 212, 214, and 216 may be programmed with one or more tuning coefficients or tuning parameters. For example, the output of the motor controller may be expressed as:

$$u(t) = K_p e(t) + K_i \int_0^t e(T) dT + K_d \frac{d}{dt} e(t)$$

where u(t) is the output signal 202, e(t) is the error between the position of motor 16 and the desired position, Kp is the tuning coefficient for the proportional term, Ki is the tuning coefficient for the integral term, and Kd is the tuning coefficient for the derivative term. The discrete representation of this would be used in digital systems. Changing these tuning coefficients can change the way motor controller 12 drives motor 16. For example, one set of coefficients may cause motor controller 12 to drive the motor so that it reaches its final position in the shortest time, another set of coefficients may cause motor 16 to reach its final position without any overshoot, and other sets of coefficients may cause motor 16 to move in various other ways.

Although described as a PID controller, motor control module 32 may comprise any other type of motor controller that employs coefficients. As described above, coefficients are data that can be programmed into a motor controller (or filter) to modify the way the motor controller (or filter) operates. Accordingly, motor control module 32 may be any type of motor controller that can be programmed with data to change the way motor control module 32 controls motor 16.

In an embodiment, filter 36 may be a digital filter that utilizes coefficients, such as a finite impulse response (FIR) filter or an infinite input response (HR) filter. If filter 36 is an FIR filter, filter 36 may have an output function similar to or the same as the following:

$$y[n] = \sum_{i=0}^{N} b_i x[n-i]$$

where x[n] is the input signal (i.e. the measured position of the motor), y[n] is the filtered output signal, N is the filter order, and $b_i$ is a set of filter coefficients, i.e. the tap weights, of the FIR filter. As the equation shows, a single FIR filter may have a set of N coefficients $b_i$.

Similarly, if filter 26 is an HR filter, filter 36 may have an output function similar to or the same as the following function:

$$y[n] = \frac{1}{a_0} \left( \sum_{i=0}^{P} b_i x[n-i] - \sum_{j=1}^{Q} a_j y[n-j] \right)$$

where y[n] is the output signal, x[n] is the input signal, P is the forward feedback filter order, Q is the feedback filter order, the series $b_i$ is set of feed-forward filter coefficients, and the series a is the set of feedback filter coefficients (with the coefficient $a_0$ being the first coefficient in the set). As the equation shows, a single HR filter may have a set of Q coefficients $a_i$ and a set of P coefficients $b_i$.

By changing the coefficients ai and bi, the transfer function of filter 36 can be changed. Accordingly, control logic module 26 may apply one or more coefficients from memory 20 to filter 36 in order to change the operation of filter 36 under particular circumstances. For example, the input filter can be used to change the way the system responds to a changes in lens position. If for example, an RC filter is used, programming the filter to have a longer time constant can help reduce the overshoot of the system.

Filter 36 may also comprise other types of filters and may have different types of coefficients. For example, filter 36 may be a ramp filter or an analog RC filter where the R or C value is controlled by a coefficient that can be programmed into a register.

Based on the inputs 220, 222, and 224, control logic module 26 may determine which set 204, 208, 210 of coefficients to apply to motor control module 32 and filter 36. For example, control logic module 26 may apply a different set of coefficients depending on whether signal 220 indicates that the system 10 is operating in a video mode or a camera mode, based on whether signal 224 has issued a command for motor 16 to move, based on a difference between the final position and the current position of motor 16, based on whether the motor has been moved by an external stimulus, or a combination thereof. In general, control logic module 26 may be programmed to apply a set of coefficients to motor control module 32 and filter 36 based on any combination of input signals.

In an embodiment, based on the input signals 220, 222, 224, control logic module 26 may apply the coefficients by reading the coefficients from memory 20 (or another memory such as memory 22 in FIG. 1), and program the coefficients into registers or memory locations within filter 36, integrator module 212, differential module 214, and/or proportional module 216.

Figure 3:
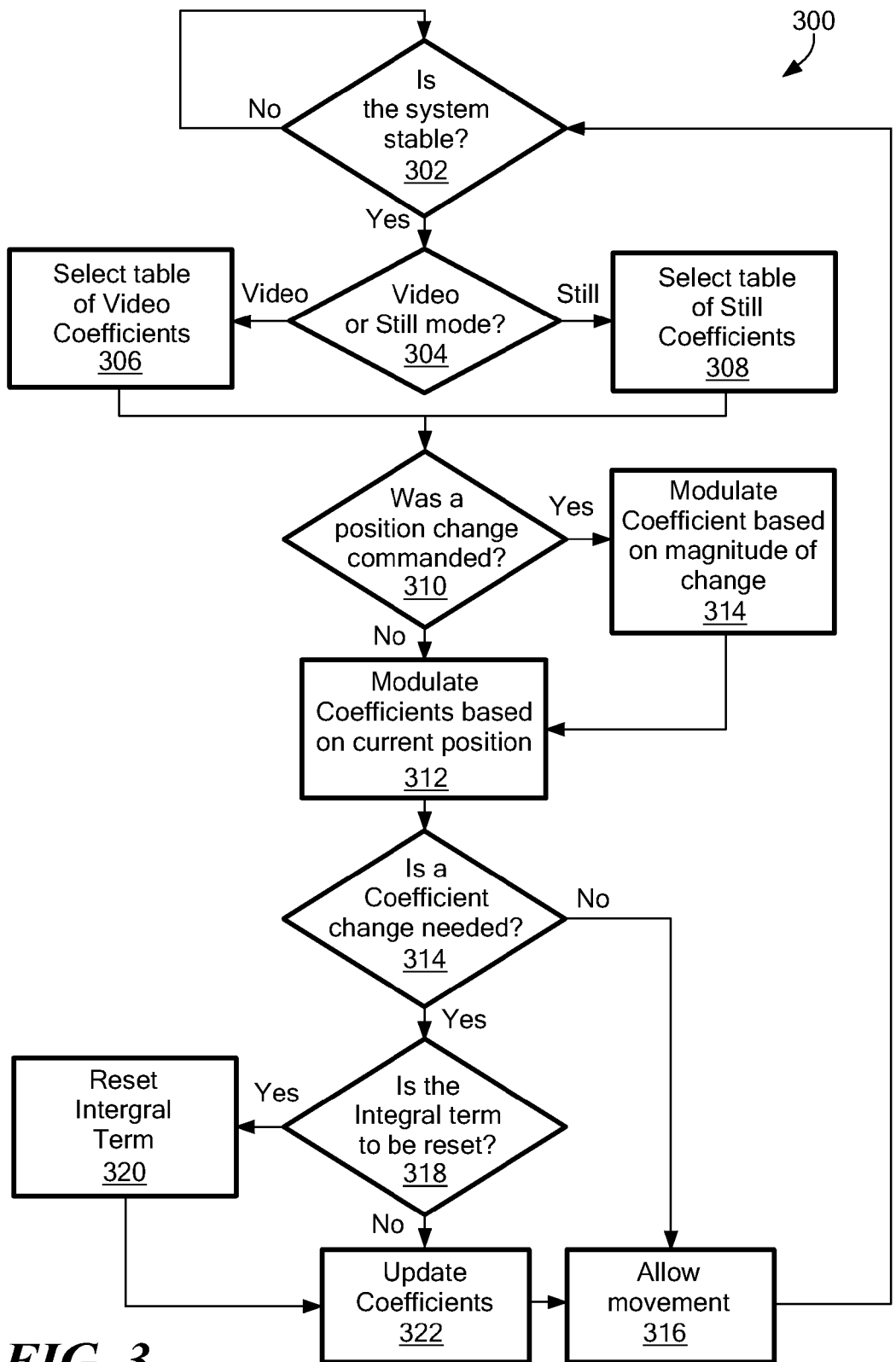
FIG. 3 is a flowchart of a method of controlling a motor.

Referring now to FIG. 3, a flowchart of a method 300 for controlling a motor is shown. In block 302, it is determined wither the system is stable, i.e. whether the motor 16 is stable, in an expected position, and not moving. If yes, method 300 may proceed to block 304 to determine whether the system 10 is in a video camera mode or a still-photo camera mode. If the system 10 is in a video camera mode of operation, method 300 may proceed to block 306 and select a table (or set) of coefficients for video operation from, for example, memory 20 (See FIG. 2). If the system 10 is in a still-photo camera mode, method 300 may proceed to block 308 and select a table (or set) of still-photo camera coefficients from, for example, memory 20. Method 300 may then proceed to block 310.

In block 310, method 300 may determine whether a command signal requesting a change in motor position was asserted. If not, method 300 may proceed to block 312 to modulate the coefficient (or coefficients) based on the current position of the motor. If so, method 300 may proceed to block 314 and modulate the coefficient (or coefficients) based on the magnitude of the requested position change, and then proceed to block 312. Modulating the coefficients may include computing the coefficients, or otherwise modifying the coefficients for the particular motor movement. Method 300 may then proceed to block 316.

In block 316, method 300 may determine whether a coefficient change is needed. For example, method 300 may determine that the coefficients should be changed if the coefficients chosen and modulated in previous blocks are different from the coefficients that are currently applied to motor control module 32 and/or filter 36 (see FIG. 2). If not, method 300 may proceed to block 316 to allow movement of the motor (i.e. to drive the motor to a new position using the already-applied coefficients). If so, method 300 may proceed block 318.

In block 318, method 300 may determine if the integral term (i.e. the output of integrator module 212 in FIG. 2) should be reset. For example, the integrator term in a PID controller may need to be reset under certain circumstances such as a new movement of the motor 16, a new coefficient being applied, after a predetermined amount of time has passed, etc. If the integral term needs to be reset, method 300 may proceed to block 320. If not, method 300 may proceed to block 322 an update the coefficients by, for example, applying the coefficients from previous blocks to motor control module 32 and/or filter 36 as described above. Once the new coefficients have been applied, method 300 may proceed to block 316.

Method 300 shown in FIG. 3 is an exemplary method and is not intended to define or limit the scope of the disclosure. In various embodiments, blocks in method 300 can be modified, removed, replaced, rearranged, and/or reordered within the scope of the disclosure.

Figure 4:
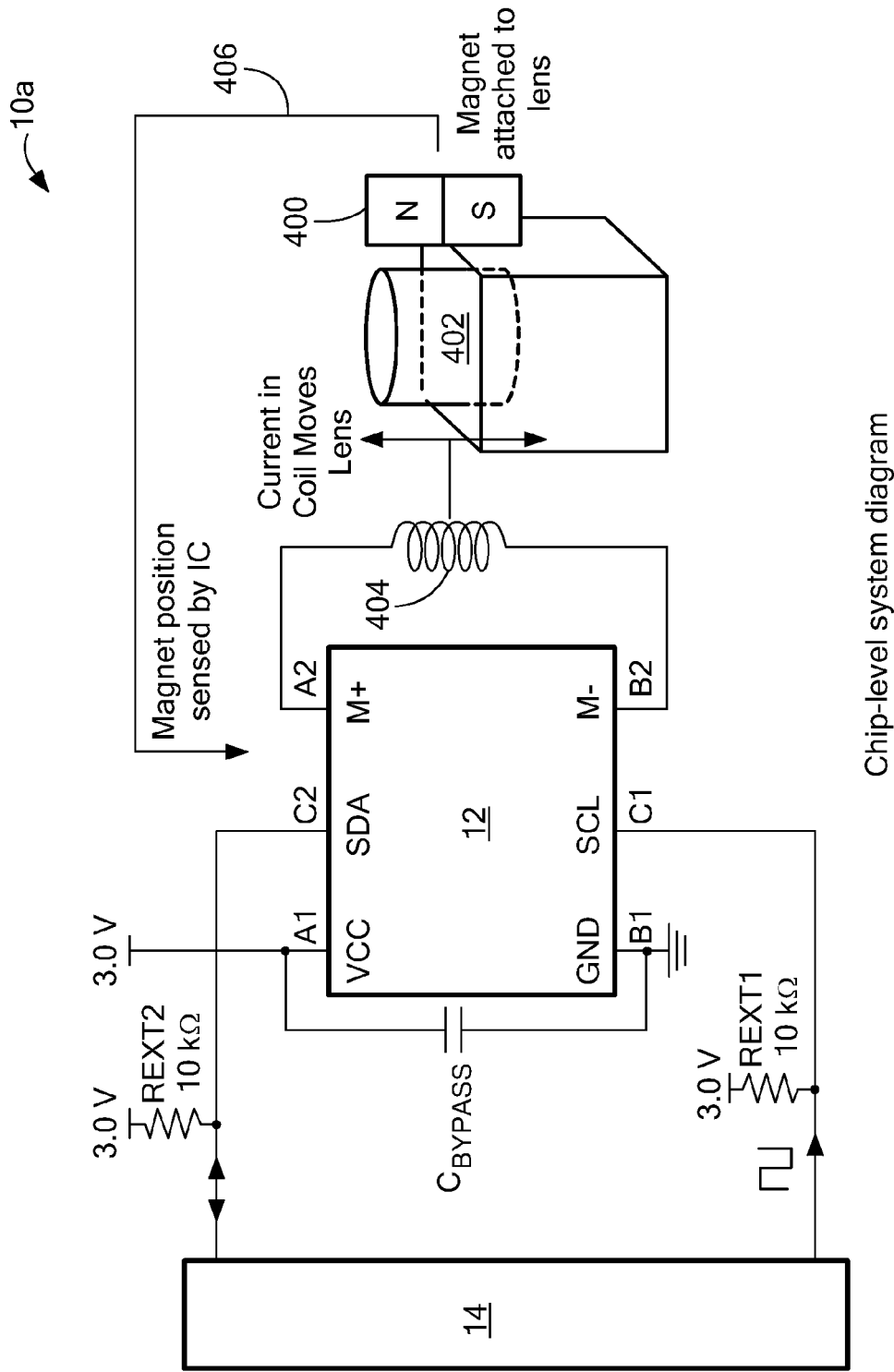
FIG. 4 is a block diagram of a system incorporating a motor controller.

FIG. 4 shows a system 10a for controlling a camera lens. A magnet 400 may be attached to a camera lens 402. Motor controller 12, which may comprise filter 36 (not shown in FIG. 4) and motor control module 32 (not shown in FIG. 4), may be coupled to motor 404. In this example, motor 404 may be a coil which, when energized, creates a magnetic field that interacts with magnet 400 to move lens 402 up and down. The position of the lens can be sensed by motor controller 12 as shown by feedback signal 406. Processor 14 may communicate with motor controller 12 via an I2C bus, for example, to issue commands and otherwise control or receive information from motor controller 12. In order to control camera lens 402, motor controller 12 may employ the methods and systems, including programming of coefficients, described above.

Having described various embodiments, which serve to illustrate various concepts, structures and techniques, which are the subject of this patent, it will now become apparent to those of ordinary skill in the art that other embodiments incorporating these concepts, structures and techniques may be used. Accordingly, the scope of the patent should not be limited to the described embodiments but rather should be limited only by the spirit and scope of the following claim.

What is claimed is:

1. A system for controlling a camera motor comprising:
 a motor driver circuit for driving the camera motor, wherein the motor driver circuit is capable of changing operation of the motor based on parameters applied to the motor driver circuit;
 a filter;
 a memory containing a plurality of sets of parameters, each set of parameters comprising parameters for controlling the camera motor and parameters for controlling a transfer function of the filter, wherein each set of parameters is associated with a respective mode of camera operation and, when programmed into the motor driver circuit and filter, causes the motor driver circuit to drive the camera motor and the filter to operate according to the respective mode of camera operation;
 a control logic module configured to choose which of the plurality of sets of parameters to apply to driving the motor and to apply to the filter, and to generate a signal indicating which set of parameters to apply; and
 a motor control module configured to receive the signal from the control logic module, apply the chosen set of parameters to the motor driver circuit for driving the camera motor and to the filter for controlling the transfer function of the filter, and command the motor driver circuit to drive the motor in accordance with the applied set of parameters.

2. The system of claim 1 wherein the control logic module is further configured to choose the set of parameters to apply based on: a mode of camera operation, a change in position of the camera motor caused by external stimulus, a distance for the camera motor to move, or a combination thereof.

3. The system of claim 1 wherein the camera motor focuses a lens of a camera.

4. The system of claim 1 further comprising a magnetic field sensor to determine a state of the camera motor, wherein the sensor comprises a Hall Effect element or a giant-magnetoresistance element.

5. The system of claim 4 wherein the motor, a camera lens, or both comprise one or more elements that affect a magnetic field that can be detected by the sensor.

6. The system of claim 4 wherein the state of the motor comprises a position of the motor, a speed of the motor, or both.

7. The system of claim 1 wherein the motor control module is a PID controller and the one or more sets of parameters comprise coefficients for a PID controller.

8. The system of claim 1 wherein at least one of the plurality of sets of parameters comprises an integration coefficient, a differential coefficient, a proportional coefficient, or a combination thereof.

9. The system of claim 1 wherein at least one of the plurality of sets of parameters comprises one or more coefficients which, when applied, result in a smooth motor motion from one motor position to another.

10. The system of claim 1 wherein at least one of the plurality of sets of parameters comprises one or more coefficients, which, when applied, result in a fastest transition from one motor position to another.

11. The system of claim 1 wherein the control logic module is further configured to choose which of the plurality of sets of parameters to apply based on whether the system is in a video mode of operation or a still-picture mode of operation.

12. The system of claim 1 wherein the control logic module is further configured to choose which of the one or more sets of parameters to apply to driving the motor based on a received command signal.

13. The system of claim 1 wherein the memory, the control logic module, and the motor control module are included in a same integrated circuit.

14. A method for controlling a camera motor comprising the steps of:
storing a plurality of sets of parameters in a memory for controlling a motor driver circuit and a transfer function of a filter, wherein each set of parameters is associated with a respective mode of camera operation and, when programmed into the motor driver circuit and the filter, causes the motor driver circuit to drive the camera motor and the filter to operate according to the respective mode of camera operation;
choosing which of the plurality of sets of parameters to apply to the motor driver circuit and filter to achieve a desired operational behavior of the motor;
changing the operational behavior of the motor by programming the motor driver circuit with the chosen set of parameters;
changing the transfer function of the filter by programming the filter with the chosen set of parameters; and
driving a motor with the motor driver circuit according to the chosen set of parameters.

15. The method of claim 14 further comprising choosing which of the plurality of sets of parameters based on: a mode of camera operation, a change in position of the motor caused by external stimulus, a distance for the motor to move, or a combination thereof.

16. The method of claim 14 wherein driving the motor comprises focusing a lens of a camera.

17. The method of claim 14 further comprising receiving a state of the motor from a sensor that comprises a Hall Effect element or a giant-magnetoresistance element.

18. The method of claim 17 wherein the motor, the lens, or both comprise one or more magnetic elements that produce a magnetic field that can be detected by the sensor.

19. The method of claim 18 wherein the receiving the state of the motor comprises receiving a position of the motor, a speed of the motor, or both.

20. The method of claim 14 wherein the plurality of sets of parameters include PID controller coefficients and programming the set of parameters comprises programming the motor driver circuit with the PID controller coefficients.

21. The method of claim 20 wherein programming the PID controller coefficients comprises programming the motor driver circuit with an integration coefficient, a differential coefficient, a proportional coefficient, or a combination thereof.

22. The method of claim 14 wherein programming the set of parameters includes programming a set of parameters which, when applied, result in a smooth motor motion from one motor position to another.

23. The method of claim 14 wherein programming the set of parameters includes programming a set of parameters, which, when applied, result in a fastest transition from one motor position to another.

24. The method of claim 14 further comprising receiving a control signal from an external source and determining which set of parameters to apply based, at least in part, upon the control signal.

25. A system for controlling a camera motor comprising:
a motor driver circuit for driving a camera motor;
a filter coupled to receive a feedback signal, filter the signal, and provide the signal to the motor driver circuit;
a memory containing a plurality of sets of parameters, each set of parameters corresponding to an operating mode of the camera motor and comprising:
one or more motor driver circuit coefficients which, when programmed into the motor driver circuit, cause the motor driver circuit to operate in accordance with the operating mode of the camera motor; and
one or more filter coefficients which, when programmed into the filter, modify a transfer function of the filter in accordance with the operating mode of the camera motor;
a control logic module configured to choose which of the plurality of sets of parameters to program into the motor driver circuit and the filter based on a set of control signals, and to generate a signal indicating which set to apply; and
a motor control module configured to receive the generated signal from the control logic module, program the chosen set of parameters into the motor driver circuit and the filter, and command the motor driver circuit to drive the motor in accordance with the applied set of parameters and the filtered feedback signal.

26. The system of claim 25 wherein the received signal is configured to specify a type of motor movement.

27. The system of claim 26 wherein the type of motor movement comprises a fast transition to a desired ending position or a smooth transition to a desired ending position.

28. The system of claim 25 wherein the motor driver circuit is a PID controller and the motor driver circuit coefficients are PID coefficients.

* * * * *

UNITED STATES PATENT AND TRADEMARK OFFICE
CERTIFICATE OF CORRECTION

PATENT NO. : 9,291,876 B2
APPLICATION NO. : 13/904356
DATED : March 22, 2016
INVENTOR(S) : Bryan Cadugan et al.

It is certified that error appears in the above-identified patent and that said Letters Patent is hereby corrected as shown below:

Specification

Column 3, line 1-2 delete "materialInGaAsP" and replace with --material--.

Column 3, line 65 delete "I2C module" and replace with --$I^2C$ module--.

Column 4, line 4 delete "a met of" and replace with --a set of--.

Column 4, line 49/50 delete "do-energize" and replace with --de-energize--.

Column 4, line 50 delete "do-energizing" and replace with --de-energizing--.

Column 6, line 21 delete "application" and replace with --applications--.

Column 7, line 12 delete "comprise" and replace with --comprises--.

Column 7, line 56 delete "Kp" and replace with --$K_p$--.

Column 7, line 57 delete "Ki" and replace with --$K_i$--.

Column 7, line 58 delete "Kd" and replace with --$K_d$--.

Column 8, line 11 delete "(HR) filter" and replace with --(IIR) filter--.

Column 8, line 26 delete "an HR" and replace with --an IIR--.

Column 8, line 39 delete "series a" and replace with --series $a_i$--.

Column 8, line 41 delete "HR filter" and replace with --IIR filter--.

Column 8, line 43 delete "ai and bi," and replace with --$a_i$ and $b_i$,--.

Column 8, line 49 delete "If for example," and replace with --If, for example,--.

Signed and Sealed this
Twenty-sixth Day of July, 2016

Michelle K. Lee
*Director of the United States Patent and Trademark Office*

CERTIFICATE OF CORRECTION (continued)
U.S. Pat. No. 9,291,876 B2

Column 9, line 13 delete "wither" and replace with --whether--.

Column 10, line 6 delete "I2C bus" and replace with --I$^2$C bus--.

Column 10, line 18 delete "claim." and replace with --claims.--.